No. 651,521. Patented June 12, 1900.
W. R. BIGSBY-CHAMBERLIN.
PHOTOGRAPHIC CAMERA SUPPORT
(Application filed Apr. 18, 1898.)
(No Model.)
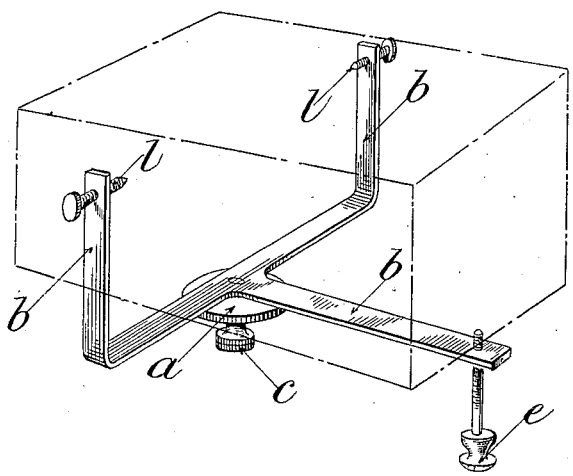
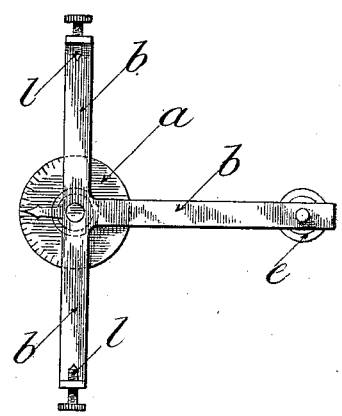
Witnesses
Inventor

UNITED STATES PATENT OFFICE.

WILLIAM RICHARDSON BIGSBY-CHAMBERLIN, OF EASTBOURNE, ENGLAND.

PHOTOGRAPHIC-CAMERA SUPPORT.

SPECIFICATION forming part of Letters Patent No. 651,521, dated June 12, 1900.

Application filed April 18, 1898. Serial No. 677,987. (No model.)

*To all whom it may concern:*

Be it known that I, WILLIAM RICHARDSON BIGSBY-CHAMBERLIN, a subject of the Queen of the United Kingdom of Great Britain and Ireland, residing at West Rocks, Grand Parade, Eastbourne, in the county of Sussex, England, have invented certain new and useful Improvements in Supports for Photographic Cameras; and I hereby declare the following to be a full, clear, and exact description of the invention, such as will enable others skilled in the art to which it appertains to make and use the same.

My invention relates to an improved support for photographic cameras, the object being to enable an operator to take panoramic or extended views in sections by any ordinary hand-camera, the said sectional views when printed being adapted for joining together to form one connected picture.

My improved support, together with the adjustment of the camera therein, is capable of movement upon two planes at right angles to each other, one plane, that of the camera-support, being horizontal, or approximately so, according to the leveling of the stand or support, while the other plane, being at right angles thereto, is vertical or approximately vertical, and this is produced by a pivotal movement of the camera upon horizontal pivots carried by the said support. The two movements are separate and are worked independently of each other.

The form of the support requires variation to enable it to be attached to various shapes or arrangements of hand-cameras without, however, departing from the nature of the invention.

In the further description of this invention reference is made to the accompanying drawings, in which—

Figure 1 is a perspective view of a support for a hand-camera, the camera being indicated by dotted lines; and Fig. 2 is a plan of the support.

A base $a$ is provided, which may in itself form the top plate of a tripod, the said base acting as a horizontal bearing to a frame-piece $b$, fitting thereon. The frame-piece $b$ is capable of turning around upon the base $a$ as a horizontal plane to all points of the compass, and a set-screw $c$ is arranged in the base $a$ to secure the frame-piece $b$ at any desired point by clamping it in position. By means of a mark or pointer on either $a$ or $b$ and a scale upon the other part, as indicated in Fig. 2, the frame-piece $b$ can be turned to a predetermined degree on the scale for the purpose of taking a view and moved from there to another predetermined point to take another view, and so on, if necessary, all around the horizon. For example, if the lens will take an angular view of, say, seventy-five degrees, but it is considered desirable to take each of a horizontal series of pictures of sixty degrees, then by taking six successive views at intervals of sixty degrees on the horizontal scale a complete picture of the horizon can be obtained by subsequently pasting together the positives, each of which would of course be trimmed to suit the said angle of sixty degrees before joining them together.

The hand-camera is indicated by dotted lines in Fig. 1, with side arms of the frame-piece $b$ bent and extending upward from the base $a$, so as to embrace the sides of the camera. A pivotal screw $l$ is adapted to work in and near the upper extremity of each of said side arms, and the camera is so placed between and adjusted on the points of the screws $l$ that their axial line passes through the optical center of the camera-lens in a horizontal plane. At the same time, and when the camera, with its stand, is leveled, a vertical line extending upward from the center or pivotal point of the base $a$ will intersect the said optical center, so that any movement upon the horizontal plane will cause the center of the lens or the optical center to pivot upon the pivotal point $a$, on which the horizontal movement takes place, the two points being on the same vertical line. Also any movement of the camera-box on the points of the two screws $l$ (and therefore a movement of the optical center on the vertical plane) will take place on the horizontal line passing through the points of the screw and the said optical center, and this assumes the proper leveling of the camera. Should, however, this not be exactly the case, the result will make very little difference in many cases and may be disregarded in practice, if approximately correct. The screw $e$ is for elevating the camera-box and for supporting it at any desired point when taking a series of views on the vertical plane.

What I claim, and desire to secure by Letters Patent, is—

A support for photographic hand-cameras consisting of a base-plate $a$ adapted to fit on the top of a tripod or equivalent stand, a frame-piece $b$, attached to the said base-plate by a screw $c$, the said frame-piece having two radial arms extending across the base-plate with their ends bent up at right angles and adapted to receive and embrace the two opposite sides of a hand-camera, each end being fitted with a screw to pivotally support said camera on a line passing through its optical center, and a third radial arm extending rearward from said base with an elevating-screw $e$ therein arranged and operating to vary the angular position of said camera on said pivotal screws as and for the purpose set forth.

In testimony whereof I hereunto affix my signature in presence of two witnesses.

WILLIAM RICHARDSON BIGSBY-CHAMBERLIN.

Witnesses:
E. KABERRY,
CHAS. ROCHE.